(No Model.) 3 Sheets—Sheet 1.
W. HUDNALL & L. D. BEARY.
ROLLER GRINDING MILL.
No. 518,955. Patented May 1, 1894.
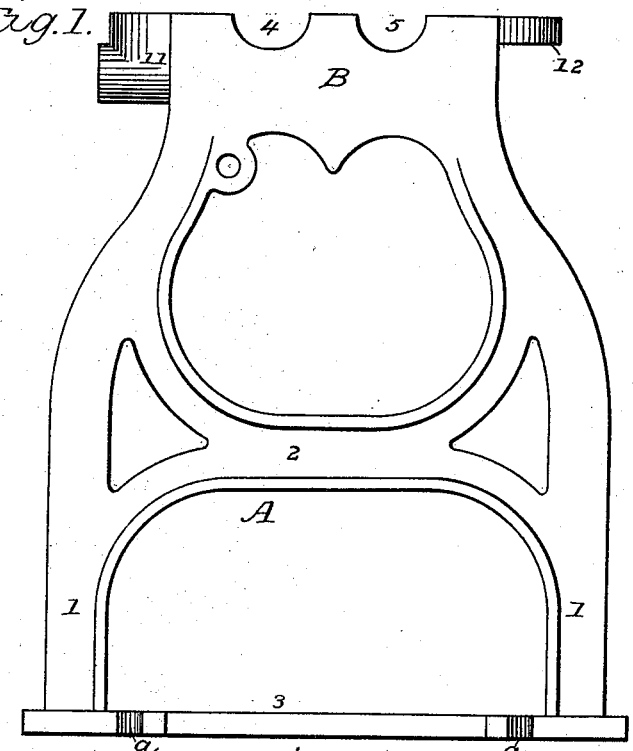
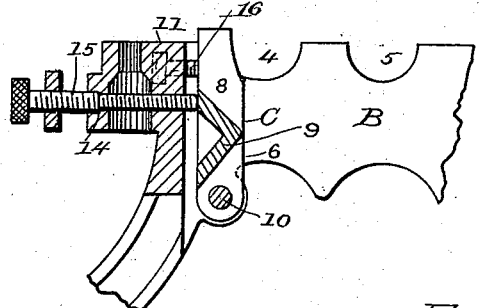
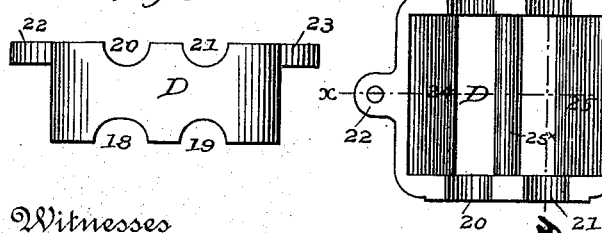
Witnesses
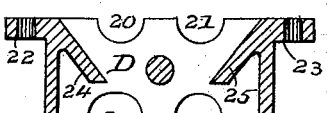
Inventors
Wm. Hudnall,
L. D. Beary,
by Hosmer & Huffman
Attorneys
THE NATIONAL LITHOGRAPHING COMPANY,
WASHINGTON, D. C.

(No Model.) 3 Sheets—Sheet 2.

W. HUDNALL & L. D. BEARY.
ROLLER GRINDING MILL.

No. 518,955. Patented May 1, 1894.

Witnesses
Inventors
William Hudnall
L. D. Beary
by Hosmer & Hoyman
Attorneys (No Model.) 3 Sheets—Sheet 3.

W. HUDNALL & L. D. BEARY.
ROLLER GRINDING MILL.

No. 518,955. Patented May 1, 1894.

Witnesses

Inventors

UNITED STATES PATENT OFFICE.

WILLIAM HUDNALL AND LORENZO D. BEARY, OF HELENA, MONTANA.

ROLLER GRINDING-MILL.

SPECIFICATION forming part of Letters Patent No. 518,955, dated May 1, 1894.

Application filed May 17, 1893. Serial No. 474,594. (No model.)

*To all whom it may concern:*

Be it known that we, WILLIAM HUDNALL and LORENZO D. BEARY, citizens of the United States of America, have jointly invented a new and useful Roller Grinding Coffee and Spice Mill, of which the following is a specification.

Our invention has relation to improvements in mills for grinding coffee and spices; and the object is to simplify and improve existing grinding mills of the kind and for the purposes mentioned, by providing a mill simple in construction, efficient in operation, durable in use, and cheap in price.

The invention is hereinafter fully described and specified, and particularly pointed out and distinctly claimed.

We accomplish the objects of our invention by the means and constructions illustrated in the accompanying drawings, wherein—

Figure 9:
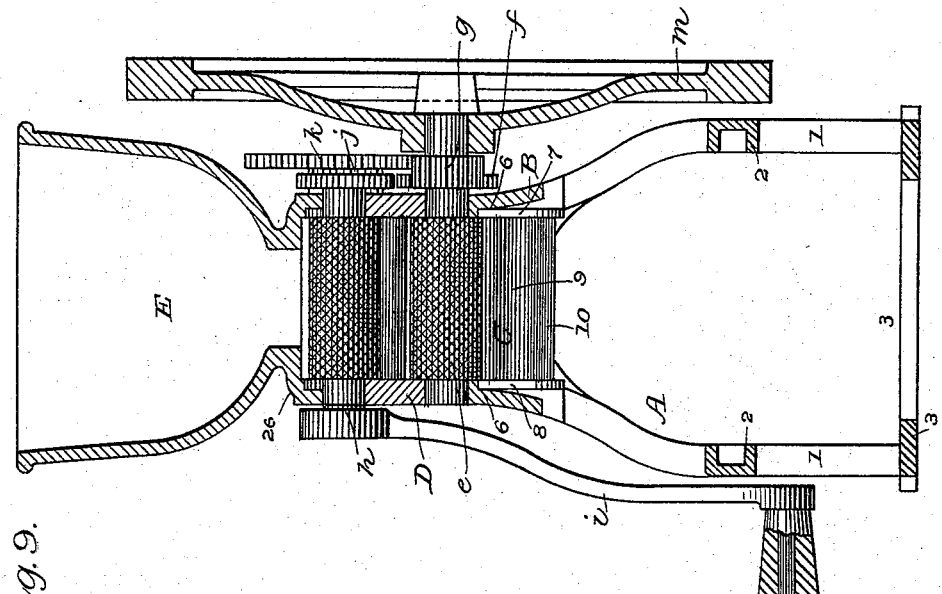
Figure 6:
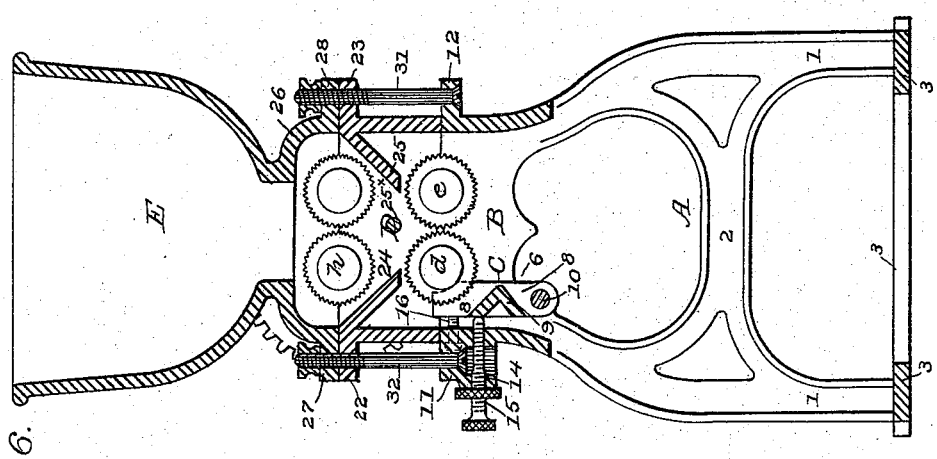
Figure 8:
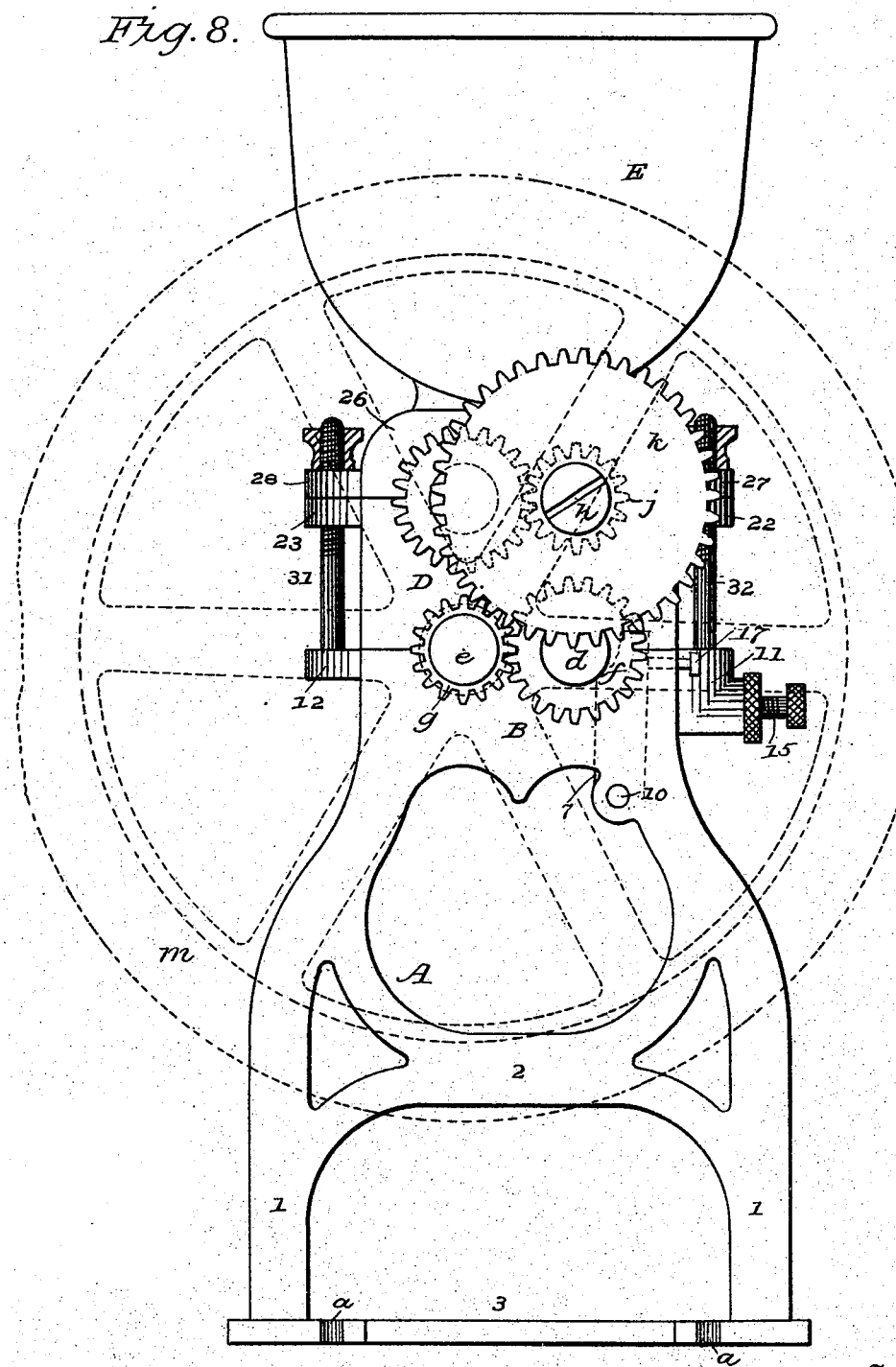

Figure 1 is a view in elevation of the stand on which the intermediate casing and the cover and hopper are mounted and secured. Fig. 2 is a top plan view of the intermediate casing. Fig. 3 is a side view of the same. Fig. 4 is a section on the line $x$—$x$ of Fig. 2. Fig. 5 is a side view of the hopper. Fig. 6 is a central vertical section of the mill showing the parts in relative arrangement. Fig. 7 is a detail of the means for adjusting the lower grinding roller. Fig. 8 is a side view showing the gearing, the fly-wheel being broken away to permit the proper illustration. Fig. 9 is a central vertical section on the line $y$—$y$ of Fig. 2 taken through the whole mill.

A designates the stand or support of the mill, made of cast metal and consisting of legs 1, at the corners connected by intermediate cross-pieces 2, and flat base-pieces 3, having screw-notches $a$, in the edges to take fastening-screws or nails, whereby the mill may be held tight and firm to a table or other surface. At the top of the support is a rectangular casing or open boxing B, the upper edge of which is planed off smooth to make a close fit or connection with the bottom edge of the intermediate case. In this casing B are formed journal-bearings or boxes 4, 5, in which are mounted and sustained the journals of the lower set of grinding-rollers. The bearing-boxes 4, are somewhat elongated, so as to give the grinding-roller therein mounted, room to be adjusted in its seat in the bearings.

In the inner faces of the end-pieces or walls of the casing B are formed vertical recesses or ways 6, located at the corners, as indicated, and in these recesses is supported the adjusting-bracket C. This bracket C consists of end pieces 7, 8, projected at their upper ends above the bearings 4, so as to bear against the journals of the roller, which end pieces are connected by an inclined cross-piece 9, serving to direct droppings from the roller inwardly, if such occur. By making the inclined cross-piece 9 integral with the pieces 7 and 8 the relative position of the incline is always retained and maintained in respect to the roller above and adjacent to it; so that the material is always delivered by the incline to the same distance under the roller. The lower ends of the end pieces 7, 8, are mounted on a bar 10, the ends of which are fixed in the side pieces of the casing B.

On the sides of the casing B are formed ears 11, 12, provided with bolt holes to take the bolts which hold the respective parts of the whole casing together. The ear 11 has an enlargement at its base through which is a threaded-hole 14, in which is a screw 15, the inner end of which bears against the face of the cross-piece of the bracket C, as shown, whereby the bracket is moved against the journals of the roller in the elongated bearings and thus regulates that roller in its relation to the other roller to grind coarser or finer. To support the end pieces 7, 8, against undue strain outward, and to prevent the bracket from warp or other displacement, set-screws 16, 17, are let through the wall of the casing adjacent to the ends of the bracket.

D designates the intermediate casing serving to couple the lower casing and the hopper part together. This casing is rectangular in cross section and fits with lower edge tight and snug on the lower casing. It is formed with recesses 18, 19, in its lower edge, constituting caps for the journals of the lower set of rollers, and correspond in shape to the bearings over which they fit or set, the one being elongated as shown, to give the journal of the adjustable roller room to be moved as heretofore stated. In the upper end of this casing D are formed journal-bearings 20, 21, in which are mounted the upper set of rollers, and on the sides are ears 22, 23, having bolt-holes registering with those in the ears of the casing below to take the fastening-bolts. In the inner sides of the casing D are formed inwardly and downwardly inclined planes 24, 25, the lower edges of which reach substantially to the middle line of the roller, as shown, and serve as a hopper for the lower set of rollers and to direct the material toward the meeting-faces of the rollers. Centrally across the casing D is fixed a bar 25, in alignment with the inner edges or faces of the lower set of the rollers, and serving to brace the casing and at the same time acting as a spreader to receive the material from the upper set of rollers and distribute it evenly over the lower set.

E designates the hopper, having formed integral therewith at its base, a cover 26, fitting on the top of the casing D, having ears 27, 28 with bolt-holes registering with those in the casings below, and also formed with recesses 29, 30, constituting caps for the journals of the upper set of rollers substantially as shown in the drawings.

The hopper, casing D, and the lower casing C are all held in position together by means of the bolts 31, 32, projected through the respective ears of the parts, and secured by thumb-nuts on their upper ends, as shown.

Journaled in the bearing boxes 4, 5, is the lower set of rollers d, e, which may be checked fine on their faces or corrugated finely so as to present surfaces suitable for grinding finely whatever material may be subjected to their action.

On the roller d is secured a pinion f, meshing with a pinion g on the neck of the roller e, the pinion g being smaller than the pinion f to give the rollers different speed in revolution, and increase their grinding or pulverizing capacity, as is well known. The pinion g is lengthened sufficiently to afford connection with the driving-wheel. In bearings in the upper casing is journaled the roller h, on one end of which is detachably secured the handle i, by which the mill is operated, and on the opposite or other end is a pinion j, and the large pinion k, the former of which meshes with the pinion on the other top roller, and the latter of which meshes with the pinion g on the lower roller e, as shown. The upper set of rollers are given different speed of rotation by making the pinions of different sizes. The neck of the roller e is extended or lengthened as shown, and carries the fly-wheel, m, whereby the force is kept regulated as in such instances. The upper set of rollers have their faces pyramidally checked or corrugated, to grind coarser than the lower set, so that the material is delivered to the action of the lower set partly broken and fully prepared for their action. The corrugations of the respective rollers are not shown, because such formations are well known.

The casing and the mechanism are assembled by placing the lower set of rollers in the bearings in the top of the casing of the support, then placing the intermediate casing in position over them, and then putting the hopper with the cover at the bottom, the upper set of rollers having been laid in their boxes, in position. The fly-wheel and the handle can be put on their supports as shown, and the mill is ready for operation. The degree of pulverization is effected by the adjustment of the adjusting screw and the bracket bearing against the adjustable roller of the lower set.

What we claim is—

1. The combination of the stand formed with roller-bearings in its upper edge one set of said bearings being elongated, an adjusting-bracket fulcrumed in the top of said stand having end-pieces to bear against a roller in the elongated bearings, said end-pieces being connected by an inclined cross-piece 9 a screw to adjust the said bracket, the middle casing formed with cap-bearings in the under edge, inclined inner sides and a central cross-bar, and bearings in its upper edge, and the hopper having a bottom piece constituting a cover for the middle casing having cap-bearings, all as and for the purpose specified.

2. The combination with the stand and the upper cover sustaining the hopper, of the middle casing D, formed with bearings in its lower and upper ends, downward and inward inclined side pieces and a central cross bar, substantially as and for the purpose specified.

3. The coffee-grinder herein-described, comprising a suitable stand having bearing-boxes formed in its upper edge one of which is elongated, and exterior vertical recesses b at the corners grinding-rollers mounted in said bearings, an adjusting-bracket fulcrumed in the vertical recesses in the side of the casing having end-pieces to bear against the necks of the roller in the elongated bearings, and connected by an inclined cross-piece a screw to adjust the bracket, a middle casing having inward inclined sides the lower edges of which set over the lower set of rollers and bearings in the upper edge of the casing, a central cross-bar 25 an upper set of grind-rollers in such bearings, a cover carrying a hopper and formed with bearing-caps to set over the neck of the rollers, fastening-bolts to hold the parts together, and gears on the rollers to rotate them, as specified.

In witness whereof we have hereto set our hands in the presence of two attesting witnesses.

W. HUDNALL.
LORENZO D. BEARY.

Attest:
H. S. MAGRAW,
C. OLANDER.